United States Patent Office 3,726,870
Patented Apr. 10, 1973

3,726,870
10-CARBAMOYL-DIBENZO[a,d]CYCLOHEPTA [1,4,6]TRIEN-5-ONES
Gerald Rey-Bellet and Hans Spiegelberg, Basel, Switzerland, assignors to Hoffmann-La Roche Inc., Nutley, N.J.
No Drawing. Application Sept. 12, 1968, Ser. No. 759,499, which is a continuation-in-part of abandoned application Ser. No. 431,981, Feb. 11, 1965. Divided and this application July 19, 1971, Ser. No. 164,107
Claims priority, application Switzerland, Feb. 18, 1964, 1,969/64; Dec. 4, 1964, 15,709/64
Int. Cl. C07d 87/34
U.S. Cl. 260—247.7 F    9 Claims

ABSTRACT OF THE DISCLOSURE

Dibenzo[a,d]cyclohepta[1,4,6]trienes bearing in the 5-position, substituents such as, for example, oxo- or 3'-lower alkoxyalkylidene and in the 10-position, substituents such as, for example, carbonyl, thiocarbonyl or guanyl radicals, for instance, 5-(3'-lower alkoxypropylidene) - dibenzo[a,d]cyclohepta[1,4,6]triene 10 - carboxylic acid di-(lower alkyl)amides and dibenzo[a,d]cyclohepta[1,4,6]trien-5-one 10-carboxylic acid cyclic amides, prepared, inter alia, from 5-(3'-lower alkoxypropylidene)-dibenzo[a,d]cyclohepta[1,4,6]triene 10 - carboxylic acid, 10-halocarbonyl - 5 - (3'-lower alkoxypropylidene)dibenzo[a,d]cyclohepta[1,4,6]triene or dibenzo[a,d]cyclohepta[1,4,6]trien-5-one 10-carboxylic acid halide, are described. The end products are useful as antidepressants.

CROSS REFERENCE TO RELATED APPLICATIONS

This application is a division of U.S. patent application Ser. No. 759,499, filed Sept. 12, 1968, now U.S. Pat. 3,631,103, patented Dec. 28, 1971, which in turn is a continuation-in-part of U.S. patent application Ser. No. 431,981, filed Feb. 11, 1965, now abandoned.

BRIEF SUMMARY OF THE INVENTION

The invention relates to compounds of the formula

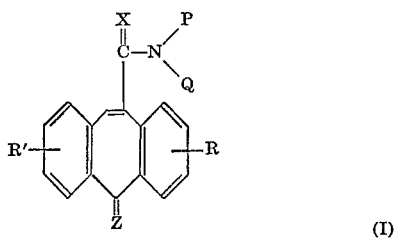

(I)

wherein R and R' are each independently selected from the group consisting of hydrogen, halogen, lower alkyl, lower alkoxy; P and Q are each independently selected from the group consisting of hydrogen, lower alkyl, benzyl, β-picolyl, di-lower alkylamino, lower alkylamino-lower alkyl and amino-lower alkyl; P and Q, when taken together with the N atom are selected from the group consisting of piperidino, lower alkylpiperidino, piperazino, pyrrolidino, morpholino, N⁴-hydroxy-lower alkyl-piperazino and 4'-(4''-chlorobenzyl)piperazino: Z is selected from the group consisting of oxo and =CH—A—B wherein A is lower alkylene and B is selected from the group consisting of halogen, lower alkoxy and lower alkylthio; and X is oxygen, sulfur or imido.

In another aspect, the invention relates to compounds of Formula I wherein Z is oxo ketalized with lower alkanol, lower alkylenediol or lower alkylidene.

In still another aspect, the invention relates to compounds of the formulae

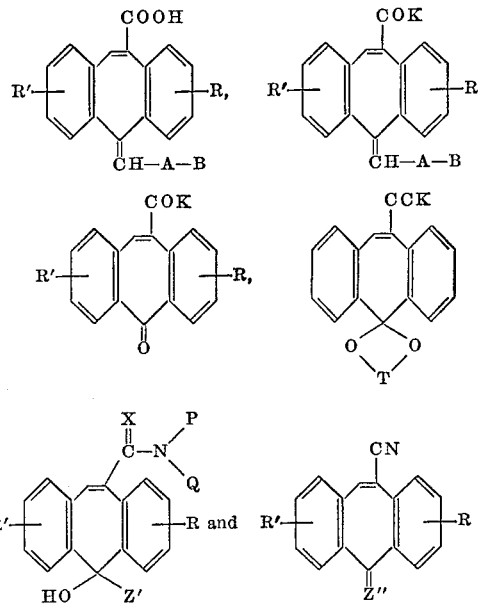

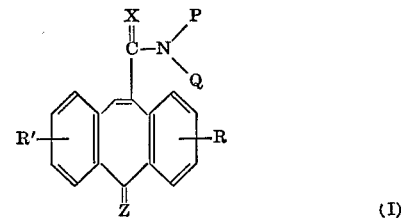

wherein R and R' are each independently selected from the group consisting of hydrogen, halogen, lower alkyl and lower alkoxy; A is lower alkylene; B is selected from the group consisting of halogen, lower alkoxy, lower alkylthio; K is selected from the group consisting of bromine, chlorine, lower alkoxy and lower alkanoyloxy; P and Q are each independently selected from the group consisting of hydrogen, lower alkyl, benzyl, β-picolyl, di-lower alkylamino, lower alkylamino-lower alkyl and amino-lower alkyl; P and Q, when taken together with the N atom are selected from the group consisting of piperidino, lower alkylpiperidino, piperazino, pyrrolidino, morpholino, N⁴-hydroxy-lower alkyl-piperazino and 4'-(4''-chlorobenzyl)-piperazino; Z' is selected from the group consisting of lower alkyl and —CH₂—A—B wherein A and B are as previously described; Z'' is selected from the group consisting of bis (lower alkoxy), lower alkylenedioxy, lower alkylidene and =CH—A—B wherein A and B are as previously described; and T is lower alkylene.

DETAILED DESCRIPTION OF THE INVENTION

The present invention relates to antidepressant tricyclic compounds, intermediates useful in their preparation and methods for the preparation thereof. More particularly, the antidepressant compounds of this invention are of the formula

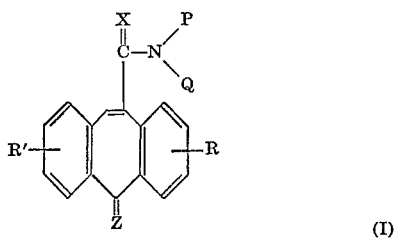

(I)

wherein R and R' are each independently selected from the group consisting of hydrogen, halogen, lower alkyl of 1–4 carbon atoms, lower alkoxy of 1–4 carbon atoms; P and Q are each independently selected from the group consisting of hydrogen, lower alkyl of 1–4 carbon atoms, benzyl, β-picolyl, di-lower alkylamino of 1–4 carbon atoms, lower alkylamino-lower alkyl of 1–4 carbon atoms and amino-lower alkyl of 1–4 carbon atoms;

P and Q, when taken together with the N atom are selected from the group consisting of piperidino, lower alkylpiperidino of 1–4 carbon atoms, piperazino, pyrrolidino, morpholino, N₄ - hydroxy-lower alkyl-piperazino of 1–4 carbon atoms and 4′-(4″-chlorobenzyl)piperazino; X is oxygen, sulfur or imido; and Z is selected from the group consisting of oxo and =CH—A—B wherein A is an alkylene of 1–4 carbon atoms and B is selected from the group consisting of halogen, lower alkoxy of 1–4 carbon atoms and lower alkylthio of 1–4 carbon atoms.

In another aspect, the invention relates to compounds of Formula I wherein Z is oxo ketalized with lower alkanol, lower alkylenedioxy or lower alkylidene.

Preferred compounds of Formula I are those wherein R¹ and R are hydrogen or halogen, P and Q are lower alkyl and when taken together with the N atom are morpholino; X is oxo and Z is oxo or =CH—A—B wherein A is ethylene and B is lower alkoxy.

Most preferred compounds of Formula I are: 5-(3′ - methoxy-propylidene) - dibenzo[a,d]cyclohepta-[1,4,6]triene 10 - carboxylic acid dimethylamide, and 10-(morpholinocarbonyl) - 5H - dibenzo[a,d]cyclohepta-[1,4,6]trien-5-one.

As indicated, the

in Formula I can represent either a free amino group or a mono or di-substituted amino group. For example, it can represent a lower alkylamino group (especially the methyl, ethyl, propyl, isopropyl or butylamino group) or an ar-alkylamino group such as a phenyl-lower alkylamino group (especially benzylamino). Also, it represents a lower alkylamino group wherein the lower alkyl part is further substituted by an amino group (i.e., amino, lower alkylamino or di-lower alkylamino) or a heterocyclic moiety, e.g., pyridyl. Such substituted lower alkylamino groups are, for example, dimethylaminoethyl-amino and pyridylmethylamino. Moreover, it can also represent a di-lower alkyl-amino group, the alkyl moieties of which each preferably contain 1–4 carbon atoms (for example, the dimethylamino group, the diethylamino group or the methylethylamino group), a lower alkyl-aralkyl-amino group (for example, an N- lower alkyl-N-(phenyl-lower alkyl)-amino group such as the methyl-benzylamino group) or a di(aralkyl) amino group such as a di-(phenyl-lower alkyl)-amino group (for example, the dibenzylamino group). The lower alkyl moieties of these disubstituted amino groups can also be substituted by an amino group or a heterocyclic moiety, as indicated above with respect to the lower alkyl part of the lower alkylamino group. The

in Formula I, when P and Q are taken together, represents a substituted or unsubstituted 5- or 6-membered heterocyclic moiety which is linked through a nitrogen atom and may contain one other hetero atom. Examples of such heterocyclic moieties are piperidino, piperazino, pyrrolidino and morpholino, as well as the corresponding lower alkyl substituted heterocyclic moieties, for example, methyl piperidino. Other substituted heterocyclic moieties are also comprehended, for example N-hydroxy-lower alkyl-piperazino (for example, N-hydroxyethyl-piperazino).

The aromatic rings of the compounds of Formula I can be unsubstituted, i.e., where R and R′ are both hydrogen, or can be substituted. The substituents represented by R and R′ are, for example, halogen, especially chlorine or bromine), lower alkyl of 1–4 carbon atoms (especially methyl or ethyl), lower alkoxy of 1–4 carbon atoms (especially methoxy or ethoxy).

In the meaning of Z as =CH—A—B, the symbol A, as indicated, represents an alkylene residue of 1–4 carbon atoms. It preferably represents a straight chain or branched chain alkylene residue separating the moiety denoted by B from the pictured carbon atom by one or especially preferred, two carbon atoms. The symbol B denotes halogen (preferably chlorine or bromine), lower alkoxy of 1–4 carbon atoms (such as methoxy or ethoxy) or lower alkylthio of 1–4 carbon atoms (such as methylthio or ethylthio). In its other meaning, Z can be oxo. It can also be ketalized oxo wherein the ketalization is effected with either a lower alkylene glycol, in which case Z represents a lower alkylenedioxy moiety; or with a lower alkanol, in which case Z represents, together with the 5-position carbon atoms, a moiety of the formula:

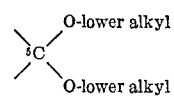

As indicated, there may be used as ketal-forming substances lower alkanols and lower alkylene glycols, for example, methanol, ethanol or ethylene glycol. In addition to the foregoing, Z can also represent a lower alkylidene moiety, for example, methylidene or ethylidene.

The basic compounds of Formula I above form acid addition salts. Such basic compounds are, for example, those of Formula I wherein

represents a basically substituted amino group. For example, the basic compounds of Formula I form pharmaceutiaclly acceptable acid addition salts with both organic and inorganic pharmaceutically acceptable acids such as, for example, hydrobromic acid, hydrochloric acid, nitric acid, sulfuric acid, phosphoric acid, hydrochloric acid, nitric acid, sulfuric acid, phosphoric acid, acetic acid, formic acid, oxalic acid, succinic acid, citric acid, methanesulfonic acid, p-toluene sulfonic acid, and the like. Acid addition salts of compounds of Formula I with pharmaceutically non-acceptable acids can be converted into free bases simply by neutralization, or can be converted into pharmaceutically acceptable acid addition salts by either neutralization followed by reaction with a pharmaceutically acceptable acid or by a simple exchange reaction with a pharmaceutically acceptable acid.

The compounds of Formula I above can be prepared from an acid of the formula:

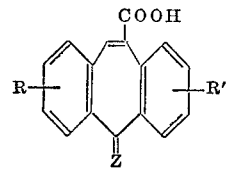

(III)

wherein R, R′ and Z have the same meaning as above or a reactive functional derivative thereof, via reaction with ammonia or a substituted amine, i.e. a compound of the formula:

(IV)

wherein P and Q have the same meaning as above.

In another embodiment, compounds of Formula I can be prepared from compounds of the formula:

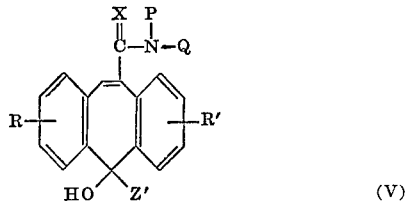

where R, R' and Z have the same meaning as above and Z' is selected from the group consisting of lower alkyl and —CH₂—A—B wherein A and B have the same meaning as above, via dehydration to yield a compound of Formula I.

In those compounds of Formula I obtained via the conversion of an intermediate of Formula III or Formula V wherein B represents halogen, the so-obtained halides can be further transformed within the definition given for B, i.e. to ethers or thioethers. Moreover, the so-obtained amides of Formula I (i.e. X=O) can be converted to thioamides (i.e., X=S). Also, the so-obtained compounds of Formula I wherein Z is oxo can be ketalized or reacted with a lower alkyl magnesium halide, the so-obtained organo-metallic compound hydrolyzed yielding a carbinol (for example, of Formula V) which can then be dehydrated to yield a compound of Formula I containing a semicyclic double bond in the 5-position. In another variant, compounds of Formula I wherein Z is a ketalized oxo group can be hydrolyzed to yield corresponding compounds of Formula I wherein Z is oxo.

The starting material compounds of Formula III can be prepared in various ways, starting from ketones of the formula:

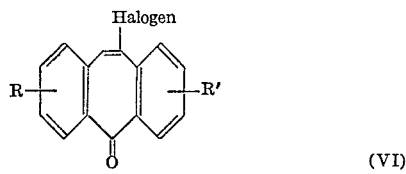

wherein R and R' have the same meaning as above. For example, compounds of Formula III above wherein Z is =CH—A—O-lower alkyl, can be prepared from compounds of Formula VI via ether derivatives of the formula:

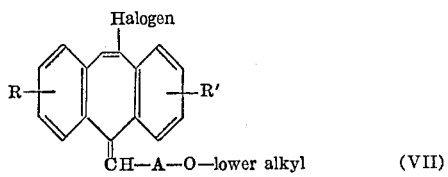

wherein R and R' have the same meaning as above.

Several additional processes utilizing the ketone of Formula VI as starting material are discussed hereinafter:

(a) A ketone of Formula VI can be reacted with a propenyl halide by means of a metal-organic reaction. This reaction can be effected, for example, by a lithium, zinc or, perferably, by a magnesium organo-metallic compound. The reaction product is then subjected to hydrolysis, preferably under conditions practically neutral, i.e. neither strongly basic nor strongly acidic, e.g. by treatment with ammonium chloride. After the hydrolysis the elements of a hydrogen halide can be added to the terminally unsaturated propenyl residue. For example, this reaction can be carried out in an advantageous manner by treating the tricyclic reaction product bearing a terminally unsaturated alkenyl residue with hydrogen bromide, conveniently with a solution of hydrogen bromide in glacial acetic acid or chloroform at room temperature. The so-obtained 5ω-halo-propylidene derivatives are for the most part viscous, difficulty crystallizable substances which can be distilled undecomposed in a high vacuum. The exchange of the ω-halogen atom for a lower alkoxy group can be effected, for example, via treatment with an alkali metal alcoholate. An alkali metal compound of a lower alkanol (e.g. sodium methylate or sodium ethylate) is especially advantageous for this purpose. The exchange reaction is conveniently effected at the boil in the presence of an excess of the alkanol corresponding to the alcoholate used.

(b) A ketone of Formula VI can be reacted with a cyclopropyl halide by means of a metal organic reaction and the reaction product can then be treated with a halogenating agent according to the conditions mentioned in process variant (a) above to yield the omega-halopropylidene-substituted compounds which can then be further reacted as described under (a).

(c) A ketone of Formula VI can be reacted directly with a lower alkoxypropyl halide. This reaction is preferably carried out via a magnesium compound according to the conditions given under (a) above. Examples of such lower alkoxypropyl halides are, for example, 1-chloro-2-methyl-3-methoxypropane, 1-chloro-3 - methoxypropane, and the like. The lower alkoxy group is advantageously one such as methoxy, ethoxy, propoxy, butoxy or the like and is advantageously at the end position (omega position) of the alkyl halide. Thus, ω-methoxypropyl magnesium compounds are preferred starting materials. Besides lower alkoxy, the ether function can also be, for example, ar-alkoxy (for example, phenyl-lower alkoxy such as benzyloxy or phenethyloxy) or also tetrahydropyranyloxy. The reaction products are hydrolyzed as described under (a) above and can then be subsequently dehydrated. According to a modification of the procedure, there can be used as a starting material a ketone of Formula VI containing no halogen substituent in the 10-position. After the introduction of the alkoxypropylidene residue in the 5-position, a halide substituent can then be introduced into the 10-position by treatment with a halogenating agent and subsequent splitting out of the elements of hydrogen halide. For the introduction of this halogen substituent, the 5-alkoxypropylidene derivative is conveniently treated in an inert solvent such as a halogenated hydrocarbon (e.g. carbon tetrachloride) with a halogen (e.g.. chlorine or bromine). This treatment with halogen is preferably carried out in the presence of a catalyst. This halogenation yields 10,11-dihalo compounds which can be converted into ether derivatives of Formula VII via the splitting out of the elements of hydrogen halide. The splitting out can be effected, for example, by means of an alkali carbonate or alkali hydroxide.

(d) A ketone of Formula VI can be reacted with an alkali metal compound of the formula:

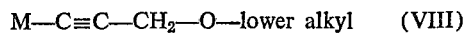

wherein M is an alkali metal. The so-obtained compound can then be hydrolyzed to yield a compound of the formula:

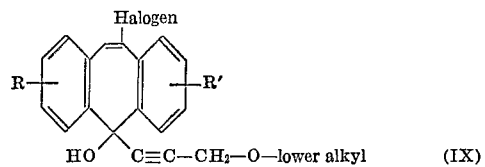

wherein R and R' have the same meaning as above.

The reaction of the ketone of Formula VI with a propinyl compound of Formula VIII is preferably carried out utilizing a compound of Formula VIII wherein M is sodium, potassium or lithium. The tricycle ketone of Formula VI can be added either in solid or finely powdered form or in an inert solvent such as, for example, absolute ether, benzene or tetrahydrofuran, to the alkali metal organic compound of Formula VIII, the latter being suspended in liquid ammonia. The decomposition of the resultant metal organic compound is advantageously effected under practically neutral conditions (e.g. ammonium chloride or an aqueous ammonium chloride solution). The products so-obtained are subsequently saturated (hydrogenated) at the side chain triple bond and then dehydrated. The hydrogenation is conveniently effected in the presence of a noble metal catalyst (e.g. platinum oxide) under normal conditions. After the theoretical amount of hydrogen to saturate the triple bond has been absorbed, the hydrogenation is advantageously immediately stopped.

(e) A tricyclic ketone of Formula VI can be reacted with a lower alkyl magnesium halide. The carbinol, i.e. the 5-hydroxy-5-alkyl derivative, formed after hydrolysis of the metal-organic reaction product, can then be converted by dehydration into the corresponding 5-lower alkylidene compound with a semicyclic double bond. The so-obtained intermediates containing the 5-lower alkylidene substituent, can then be converted into 10-carboxy compounds or, alternatively, can be treated with a halogenating agent, for example a compound containing a 5-ethylidene substituent can be halogenated to a corresponding compound containing a β-haloethylidene substituent. The β-haloethylidene moiety can, in turn, be converted into a β-lower alkoxy ethylidene moiety according to the conditions given under (a).

(f) A ketone of Formula VI can be converted into a corresponding compound containing a ketalized oxo group in the 5-position via conventional ketalization means, i.e. by treatment with a lower alkylene glycol such as ethylene glycol or by treatment with a lower alkanol such as methanol or ethanol.

Compounds of Formula III containing a 10-carboxy group can be obtained from the corresponding 10-halo compounds obtained as described above (e.g. in process variants (a)–(f)) by exchange of the halogen atom in the 10-position for a carboxy group which may be functionally modified.

Compounds of Formula III can thus be obtained from corresponding 10-halo compounds via several different methods. In one method, the corresponding 10-halo compound can be treated in an inert solvent (e.g. tetrahydrofuran) with magnesium and the so-obtained magnesium-orgnaic compound reacted with carbonic acid. Hydrolysis then yields a 10-carboxylic acid of Formula III which, if desired, can be converted in a manner known per se into its functional derivatives such as esters (especially with lower alkanols), carbonyl halides (especially chlorides and bromides), or anhydrides. To obtain compounds of Formula III wherein Z is oxo, it is suitable to protect the 5-oxo group of the 10-halo starting material prior to the treatment with magnesium. This protection is suitably effected via ketalization, for example, with ethylene glycol. After the treatment with carbonic acid, the ketal group can be hydrolyzed to regenerate the 5-oxo group or alternatively, the ketal group can be regenerated after subsequent reaction steps.

Compounds of Formula III can also be obtained from corresponding 10-halo compounds via treatment of the latter with a metal cyanide (e.g. sodium cyanide, potassium cyanide or copper cyanide) in an inert solvent whereby there is obtained a compound corresponding to those of Formula III which, instead of the 10-carboxy group pictured in Formula III, carries a 10-cyano substituent. Via saponification of the cyano group, the desired 10-carboxy compound of Formula III can be obtained. Functional derivatives of the 10-carboxy substituent can be prepared according to known methods as indicated above. Prior to the treatment with the metal cyanide, it is suitable to protect a 5-oxo group via ketalization, if the starting material used contains such.

Starting materials of Formula III in which Z is =CH—A—B and B is halogen, can be prepared, for example, from the corresponding alkoxy substituted compounds, by treatment with hydrogen halide or especially by treatment with boron trihalide. In one convenient method, the alkoxy substituted alkylidene compound of Formula III is treated with a 2-molar quantity of boron trihalide in the presence of an inert solvent, e.g. methylene chloride, at a low temperature, for example, at about −10° C.

Starting materials of Formula V which, as indicated above, can be converted via dehydration to the desired end products of Formula I, can themselves be obtained from the ketones of Formula VI. Thus, the halo substituent in the 10-position of the ketone of Formula VI can be replaced by the cyano group by treatment with a metal cyanide (especially preferred is a copper cyanide). After saponification of the cyano group and reaction of the so-formed free carboxylic acid or one of its functional derivatives with an amine, there are obtained compounds of Formula I wherein Z is oxo, i.e. 10-carbamoyldibenzo[a,d]cyclohepta[1,4,6]trien-5-ones. These latter 5-oxo compounds can be converted into compounds of Formula V; for example, via reaction with an alkali metal compound of Formula VIII, subsequent hydrolysis and hydrogenation according to the conditions mentioned under (d).

The manifold possibilities for the production of the starting materials discussed in the foregoing paragraphs are only exemplary. Numerous other process variants are available and will be apparent to those skilled in the art.

The compounds of Formula III can be reacted directly with ammonia or the substituted amines of Formula IV in the form of the free acid or alternatively, as a functional derivative. When the free acid of Formula III is used, the reaction is conveniently carried out in the presence of a condensing agent, e.g. an N,N′-disubstituted carbodiimide. Reactive acid derivatives which can be used are, for example, lower alkyl esters, carbonyl halides (especially chlorides or bromides), nitriles and anhydrides of the 10-carboxy acids of Formula III. When nitriles are used, amidine derivatives are obtained (for example by treatment of the nitrile with an amine magnesium halide in an inert organic solvent such as ether or tetrahydrofuran a guanyl (X=imido) compound of Formula I is obtained. It should be noted that, if a nitrile starting material containing an oxo group is used, the 5-oxo group should be protected by ketalization prior to the treatment with the amine-magnesium halide. For reaction with the free acid of Formula III or the lower alkyl ester, carbonyl halide or anhydride functional derivatives thereof, there is suitably used a compound of Formula IV, for example, ammonia, a lower alkyl amine (e.g. methylamine), a di-lower alkyl amine (e.g. dimethylamine) or a heterocyclic amine such as piperidine, morpholine, N-hydroxyethyl-piperazine, or the like. Especially preferred are the di-lower alkylamines, such as dimethylamine.

When the reaction is effected with a carbonyl chloride corresponding to Formula III (which acid chlorides are accessible from the free acids of Formula III, for example, by treatment of the latter with thionyl chloride with heating), the amidation is conveniently effected at a very low temperature, for example from about 0° C. to about 30° C. Esters which can be obtained from the free acids in a manner known per se are advantageously reacted with the desired amine at an elevated temperature, under elevated pressure if necessary.

Compounds of Formula V can be dehydrated as indicated above. This dehydration is advantageously effected by heating the compound of Formula V with a lower alkanolic hydrochloric acid. However, it is also possible to dehydrate with other dehydration agents such as, for example, phosphorus oxychloride, p-toluene-sulfonyl chloride, sulfuric acid, zinc chloride, potassium bisulfate, or the like, in an inert organic solvent (such as, for example chloroform or methylene chloride).

As indicated above, in those products of Formula I obtained via amidation or dehydration wherein the symbol Z is =CH—A—B, the substituent represented by B can itself be further transformed in reaction steps subsequent to the amidation or dehydration. For example, compounds of Formula I in which said substituent B represents a halogen atom can be reacted with a metal alcoholate or metal mercaptan, preferably an alkali metal lower alcoholate or an alkali metal lower alkyl mercaptan, conveniently in the presence of the lower alcohol corresponding to the alcoholate or mercaptan used. Suitably, the metal compound is added suspended in an inert solvent. Compounds of Formula I wherein B is lower alkoxy or lower alkylthio are thus obtained.

Moreover, carboxylic acid amides of Formula I can be converted to corresponding thioamides of Formula I by treatment with phosphorus-sulphur compounds (e.g. phosphorus pentasulfide), preferably in a neutral, anhydrous solvent or diluent at a temperature from about 50° C. to about 120° C.

Compounds of Formula I wherein Z represents a ketal group can be converted to corresponding ketones, i.e. wherein Z is oxo, via warming with dilute acids (for example, dilute mineral acids). The oxo group in ketones of Formula I can themselves be transformed into lower alkylidene moieties, for example by reaction of the ketone with an alkyl magnesium halide. This latter conversion is only possible if the

amino group and the imido group X are resistent to the Grignard reagent used.

The compounds of Formula I can occur in various isomeric forms. Mixtures of different isomers can be separated into the separate cis and trans antipodes according to methods known per se; for example, by fractional crystallization on the basis of different solubility of the individual isomers or derivatives thereof. Separation of the geometrical isomers can be effected with the starting materials or at the intermediate stages. Subsequent reaction then yields pure isomers and, in this instance, the end products of Formula I are obtained in the form of a pure geometric isomer.

The compounds of Formula I, as well as their pharmaceutically acceptable acid addition salts are characterized by their antidepressant action on the central nervous system and are useful as antidepressants. They are especially useful as antidepressants in that they give rise to only a very slight anti-cholinergic effect. These compounds are useful not only in relief of symptomatology associated with depression of the central nervous system, but are also useful in the prevention and reversal of central nervous system depression caused by exogenous chemical agents. An especially advantageous subclass of compounds of Formula I are those wherein R and R' are both hydrogen.

The compounds of Formula I as well as their pharmaceutically acceptable acid addition salts, can be administered internally for example, enterally (e.g. orally) or parenterally, with dosage adjusted to individual requirements. They can be administered in the form of conventional pharmaceutical preparations containing conventional organic or inorganic pharmaceutical solid or liquid carrier materials suitable for enteral, e.g. oral, or parenteral administration. For example, the pharmaceutically active ingredient of Formula I or a pharmaceutically acceptable acid addition salt thereof can be compounded according to conventional methods with conventional pharmaceutical carriers which do not react with the active ingredient, such as water, gelatin, lactose, starches, magnesium stearate, talc, vegetable oils, gums, polyalkylene glycols, petroleum jelly and the like. The pharmaceutical preparations can be in solid form, for example, tablets, dragées, suppositories or capsules, or in liquid form, for example, solutions, emulsions or suspensions. If desired, they can be submitted to pharmaceutical expedients such as sterilization or can contain conventional excipients such as preservatives, stabilizing agents, wetting or emulsifying agents, salts for the adjustment of osmotic pressure, or buffers, and they also can contain, in combination, other therapeutically active substances.

The useful psychopharmacological antidepressant activity of the compounds of Formula I is demonstrated in warm-blooded animals utilizing standard procedures. For example, groups comprising 10 mice each are administered the test substance in variable amounts subcutaneously. After 16 hours, they are given subcutaneously 5 mg./kg. of 2-hydroxy-2-ethyl-3-isobutyl-9,10-dimethoxy-1,2,3,4,6,7-hexahydro - 11bH - benzyl[a]quinolizine (substance A), and 30 minutes thereafter, they are given intraperitoneally 4.00 mg./kg. of ethanol. A control group of 10 animals is given only ethanol. The duration of sleep is measured in all animals. The percentage decrease in duration in sleep in comparison with the duration of the substance A potentiated sleep reflects the psychopharmacological antidepressant effect.

When 5-(3'-methoxy - propylidene)dibenzo[a,d]cyclohepta[1,4,6]triene - 10 - carboxylic acid dimethylamide, which has an $LD_{50}$ of 2000 mg./kg. p.o., is utilized as the test substance at a dosage of 20 mg./kg. s.c., a corresponding 54 percent decrease in duration of sleep is produced, and at a dosage of 10 mg./kg. s.c., a corresponding 45 percent decrease in duration of sleep is produced.

When 10-morpholinocarbonyl-dibenzo[a,d]cyclohepta[1,4,6]trien-5-one, which has an $LD_{50}$ of 3500 mg./kg. p.o., is utilized as the test substance at a dosage of 20 mg./kg. s.c., a corresponding 56 percent decrease in duration of sleep is produced.

The following examples are illustrative but not limitative of the invention. All temperatures are stated in degrees centigrade.

EXAMPLE 1

A solution of 16.2 g. of 5-(3'-methoxy-propylidene)-dibenzo[a,d]cyclohepta[1,4,6]triene 10 - carboxylic acid chloride in 50 ml. of dry benzene is added dropwise with stirring to a solution of 10 g. of dimethyl amine in 100 ml. of dry benzene. During the addition, the temperature is held at 20–25° with a cold water-bath. After the addition, the reaction mixture is stirred for a further 30 minutes at 20°, boiled under reflux conditions for 30 minutes, and then the benzene and the excess amine are distilled off under reduced pressure. The residue is taken up in benzene, the solution washed with water; dilute hydrochloric acid, water, sodium bicarbonate solution and again with water, dried and evaporated. Recrystallization of the residue from high-boiling petroleum ether, yields 5-(3'-methoxy - propylidene) - dibenzo[a,d]cyclohepta[1,4,6]triene 10-carboxylic acid dimethyl amide which melts at 111–112°.

The 5-(3'-methoxy-propylidene) - dibenzo[a,d]cyclohepta[1,4,6]triene 10-carboxylic acid used as the starting compound is manufactured as follows:

In a 2-liter round flask which is provided with stirrer, dropping funnel and reflux condenser, 15 g. of magnesium shavings are covered with 20 ml. of dry ether, and then treated with 0.5 ml. of methyl iodide. As soon as the reaction has started, a solution of 54.6 g. of 1-methoxy-3-chloro-propane in 300 ml. of ether is added dropwise in such a way that the reaction mixture is held at boiling. After the dropwise addition is completed, the reaction mixture is boiled under reflux for a further 3 hours.

The reaction mixture is then cooled with ice-water, a solution of 69.2 g. of 10-bromo-dibenzo[a,d]cyclohepta-[1,4,6]trien-5-one in 500 ml. of ether is added dropwise in the course of 40 minutes, and the whole reaction mixture is then stirred under reflux at 45° for 16 hours.

On the following day the reaction mixture is once again cooled with ice-water and is treated with a cold saturated ammonium chloride solution. The organic layer is then separated, the aqueous phase shaken up with 200 ml. of ether and the combined ether portions dried over sodium sulphate and evaporated. After recrystallization from high-boiling petroleum ether, the residue yields colorless crystals of 5-hydroxy-5-(3'-methoxypropyl) - 10 - bromo-dibenzo[a,d]cyclohepta[1,4,6]triene melting at 82–84°.

50 g. of 5-hydroxy-5-(3' - methoxy - propyl-10-bromo-dibenzo[a,d]cyclohepta[1,4,6]triene and 500 ml. of 3 percent alcoholic hydrochloric acid solution are heated under reflux conditions on the steam-bath for 3 hours, and the solution evaporated under reduced pressure. The residue is then taken up in 300 ml. of ether, the ethereal solution is washed with aqueous sodium bicarbonate, thereafter washed with water, dried over sodium sulphate and evaporated. After distillation of the residue under 0.055 mm. Hg at 155° and repeated recrystallization from petroleum ether, colorless crystals of 5-(3'-methoxy-propylidene)-10-bromo - dibenzo[a,d]cyclohepta[1,4,6]triene melting at 113–115° are obtained.

In a 1 liter three-necked flask provided with stirrer, dropping funnel and reflux condenser, 6 g. of magnesium shavings are treated with a few drops of methyl iodide and, as soon as the reaction has started, a solution of 68 g. of 5-(3'-methoxy-propylidene)-10-bromo - dibenzo-[a,d]cyclohepta[1,4,6]triene in 300 ml. of dry, peroxide-free tetrahydrofuran is added dropwise in such a way that the internal temperature is maintained between 50 and 55°. Subsequently, the reaction mixture is boiled under reflux for a further 3 hours, during which refluxing, the magnesium almost completely disappears.

The resultant light brown solution is cooled at −20°, and is then treated with a dry stream of carbonic acid. After 2 hours the reaction has ended, and the reaction mixture is decomposed with a saturated ammonium chloride solution. The tetrahydrofuran is then evaporated off under reduced pressure, the residue extracted with ether and the etheral solution extracted with dilute sodium carbonate solution. The reaction product precipitates out on acidification of the alkaline solution with hydrochloric acid. It is then extracted with ether, the etheral solution washed, dried and evaporated. After recrystallization from acetic ester/petroleum ether, 5-(3'-methoxy-propylidene)-dibenzo[a,d]cyclohepta[1,4,6] 10 - carboxylic acid is obtained in the form of colorless crystals melting at 177–180°.

15.3 g. of 5-(3'-methoxy-propylidene)-dibenzo[a,d]cyclohepta[1,4,6]triene 10-carboxylic acid and 50 ml. of thionyl chloride are boiled under reflux conditions for 3 hours. The excess thionyl chloride is distilled under reduced pressure and the residue is recrystallized from petroleum ether. The so-obtained 5-(3'-methoxy-propylidene)-dibenzo[a,d]cyclohepta[1,4,6]triene 10-carboxylic acid chloride melts at 106–108°.

EXAMPLE 2

16.2 g. of 5-(3'-methoxy - propylidene) - dibenzo[a,d]cyclohepta[1,4,6]triene 10-carboxylic acid chloride is dissolved in 70 ml. of dry benzene and added dropwise at 20–25° to a mixture of 12.2 g. of methyl-(β-picolyl)-amine and 100 ml. of dry benzene. The reaction mixture is then further stirred for an additional hour at 20°, diluted with ether and extracted with dilute hydrochloric acid. The acidic solution is treated with excess potassium carbonate, and the precipitated oil extracted with ether, the ether phase dried and evaporated, yielding 5-(3'-methoxy-propylidene) - dibenzo[a,d]cyclohepta[1,4,6]triene 10-carboxylic acid N-methyl-N-(β-picolyl)-amide. The hydrochloride of this substance is formed and recrystallized from ethanol/ether and melts at 103–105°.

EXAMPLE 3

By the replacement of the methyl-(β-picolyl)-amine in Example 2 with 26 g. of 4-hydroxyethyl-piperazine there is obtained 5-(3'methoxy-propylidene)-10-[4'-(2''-hydroxy-ethyl)-piperazino - carbonyl] - dibenzo[a,d]cyclohepta[1,4,6]triene, the hydrochloride of which (recrystallized from ethanol/ether) melts at 210–213°.

EXAMPLE 4

By the replacement of the methyl-(β-picolyl)-amine in Example 2 with 10 g. of dimethylamino-ethylamine there is obtained 5-(3' - methoxy - propylidene) - dibenzo[a,d]cyclohepta[1,4,6]triene 10-carboxylic acid 2'-dimethylamino-ethylamide as colorless crystals (melting at 118–119°).

EXAMPLE 5

A solution of 4.0 g. of dimethylamine in 100 ml. of ether is added dropwise at room temperature to a solution of ethyl magnesium bromide (prepared from 1.9 g. of magnesium shavings, 8.2 g. of ethyl bromide and 100 ml. of ether). The reaction mixture is then heated for 20 minutes under reflux, cooled to 20° and treated with a solution of 14.35 g. of 5-(3'-methoxy-propylidene)-dibenzo[a,d]cyclohepta[1,4,6]triene 10-carboxylic acid nitrile in 100 ml. of ether. The whole reaction mixture is then boiled for 3 hours under reflux conditions, cooled with ice-water and decomposed with a cold saturated ammonium chloride solution. There precipitates a mixture of hydrobromide and hydrochloride which is filtered off by suction, and is shaken for 15 hours with 10 g. of freshly precipitated silver chloride in 800 ml. of water in the absence of light. Filtration, evaporation and recrystallization of the residue from methanol/ether yields 5 - (3' - methoxy-propylidene)-dibenzo[a,d]cyclohepta[1,4,6]-triene 10-carboxylic acid N,N-dimethyl amidine hydrochloride in the form of colorless crystals melting at 290–291°.

The 5-(3' - methoxy-propylidene)dibenzo[a,d]cyclohepta[1,4,6]triene 10-carboxylic acid nitrile used as starting material can be manufactured as follows:

17.05 g. of 5-(3'-methoxy-propylidene)-10-bromo-dibenzo[a,d]cyclohepta[1,4,6]triene, 9.0 g. of cuprous cyanide and 50 ml. of dimethylformamide are heated under reflux conditions for 5 hours with stirring. The dimethylformamide is then distilled off under reduced pressure and the residue is extracted with boiling benzene. After evaporation of the benzene there remains behind an oil which boils at 170° under 0.005 mm. Hg. The oil is recrystallized from high boiling petroleum ether yielding 5-(3'-methoxy-propylidene) - dibenzo[a,d]cyclohepta[1,4,6]triene carboxylic acid nitrile which melts at 92–94°.

EXAMPLE 6

16.2 g. of 5-(3'-methoxy-propylidene)-dibenzo[a,d]cyclohepta[1,4,6]triene 10-carboxylic acid chloride is dissolved in 50 ml. of dry benzene and the resultant solution is then added dropwise with stirring at 20° to a solution of 12.1 g. of methyl-benzylamine in 100 ml. of dry benzene. The reaction mixture is stirred for a further 30 minutes at 20°, then 30 minutes at 50°, diluted with ether, washed, dried and evaporated. By recrystallization of the residue from methanol/water 5-(3'-methoxy-propylidene) dibenzo[a,d]cyclohepta[1,4,6]triene 10-carboxylic acid N-methyl-N-benzyl amide (melting at 124–126°) is obtained.

EXAMPLE 7

By reaction of 5-(3'-methoxy-propylidene)-dibenzo[a,d]cyclohepta[1,4,6]triene 10-carboxylic acid chloride with diethyl amine in benzene there is obtained 5-(3'-methoxy - propylidene) - dibenzo[a,d]cyclohepta[1,4,6]triene 10-carboxylic acid diethyl amide which is recrystallized from benzene/petroleum ether and melts at 118–120°.

EXAMPLE 8

10 g. of 5-(3'-methoxy-propylidene)-dibenzo[a,d]cyclohepta[1,4,6]triene 10-carboxylic acid dimethyl amide, 6.66 g. of phosphorus pentasulphide and 100 ml. of dry benzene are heated under reflux conditions for 2 hours, and the reaction mixture then filtered while still warm. The solid residue is extracted twice, each time with 150 ml. of boiling benzene, and the combined benzene extracts are evaporated to dryness. There remains behind 10 g. of 5-(3'-methoxy-propylidene)-dibenzo[a,d]cyclohepta[1,4,6]triene 10-carboxylic acid thiodimethyl amide which, after recrystallization from benzene/petroleum ether, melts at 184–185°.

EXAMPLE 9

20 g. of 5-(3'-methoxy-propylidene)-dibenzo[a,d]cyclohepta[1,4,6]triene 10-carboxylic acid is dissolved in 80 ml. of methylene chloride and treated dropwise at −10° with a solution of 16 g. of boron trichloride in 40 ml. of methylene chloride. After the dropwise addition, the reaction mixture is stirred for a further 15 hours at 20°. The solution obtained is then completely evaporated under reduced pressure, the residue dissolved in dry benzene, again evaporated, the newly obtained residue dissolved in 100 ml. of dry benzene and this solution slowly added to a mixture of 30 g. of dimethyl amine and 300 ml. of dry benzene. The reaction mixture is now further stirred at 20° for 30 minutes, then washed with water, dilute hydrochloric acid, water, sodium carbonate solution and lastly with water, dried and evaporated. By recrystallization of the residue from high boiling petroleum ether 5-(3'-chloro-propylidene) - dibenzo[a,d]cyclohepta[1,4,6]triene 10-carboxylic acid dimethyl amide of melting point 141–143° is obtained.

EXAMPLE 10

6 g. of 5-(3'-ethoxy-propylidene)-dibenzo[a,d]cyclohepta[1,4,6]triene 10-carboxylic acid and 25 ml. of thionyl chloride are heated for 3 hours under reflux conditions. The excess thionyl chloride is then distilled off under reduced pressure, the residue dissolved in 50 ml. of dry benzene and this solution added dropwise at 20–30° to a mixture of 10 g. of dimethylamine and 100 ml. of dry benzene. The whole reaction mixture is then heated for a further 30 minutes under reflux conditions, cooled, washed with dilute hydrochloric acid, water, sodium carbonate solution and water, dried and evaporated. After recrystallization from high boiling petroleum ether the residue yields colorless crystals of 5-(3'-ethoxy-propylidene)-dibenzo[a,d]cyclohepta[1,4,6]triene 10-carboxylic acid dimethyl amide melting at 123–124°.

The 5-(3'-ethoxy-propylidene)-dibenzo[a,d]cyclohepta[1,4,6]triene 10-carboxylic acid used as starting material can be manufactured as follows:

30 g. of magnesium shavings (in a round flask which is fitted with a stirrer, dropping funnel and reflux condenser) are treated with a solution of 123.5 g. of 1-chloro-3-ethoxypropane in 600 ml. of dry ether in such a way that the ether is kept slightly boiling. The reaction mixture is then heated with stirring under reflux conditions for a further 3 hours, after which it is cooled with ice-water, and a solution of 138.4 g. of 10-bromo-dibenzo[a,d]cyclohepta[1,4,6]triene-5-one in 800 ml. of dry ether is added dropwise in the course of 60 minutes. After the addition is completed, the whole reaction mixture is stirred at 45° for 15 hours.

On the following day the reaction mixture is once more cooled with ice, and then treated with a cold saturated ammonium chloride solution. The organic layer is separated, the aqueous phase twice extracted, each time with 200 ml. of ether, and the combined ether-portions dried over sodium sulphate and evaporated. After recrystallization from petroleum ether the residue yields 5-hydroxy-5-(3' - ethoxy-propyl)-10-bromo-dibenzo[a,d]cyclohepta[1,4,6]triene melting at 68–72°.

50 g. of 5-hydroxy-5-(3'-ethoxy-propyl)-10-bromo-dibenzo[a,d]cyclohepta[1,4,6]triene and 500 ml. of a 3 percent alcoholic hydrochloric acid solution are boiled under reflux for 3 hours and the resultant solution evaporated under reduced pressure. The residue is taken up in 300 ml. of ether, the so-obtained ethereal solution washed with aqueous sodium carbonate, dried over sodium sulphate and evaporated. 5-(3'-ethoxy-propylidene)-10-bromo-dibenzo[a,d]cyclohepta[1,4,6]triene melting at 92–95° is obtained by recrystallization of the residue from high boiling petroleum ether.

1.8 g. of magnesium shavings (in a round flask fitted with stirrer, dropping funnel and reflux condenser) are treated with single drops of methyl iodide and as soon as the reaction has started a solution of 20 g. of 5-(3'-ethoxypropylidene) - 10 - bromo-dibenzo[a,d]cyclohepta[1,4,6]triene (melting at 92–95°) in 100 ml. of dry, peroxide-free tetrahydrofuran is added dropwise in such a way that the internal temperature is held between 50 and 60°. Subsequently, the reaction mixture is boiled under reflux for a further 3 hours, whereby the magnesium almost completely disappears.

Dry carbonic acid is then passed for 2 hours into the resultant brown solution which is cooled to −20°. Then the reaction mixture is decomposed with a cold saturated ammonium chloride solution, the tetrahydrofuran distilled off under reduced pressure, the residue extracted with ether and the ethereal solution extracted with dilute sodium carbonate solution. The reaction product precipitates on acidification of this alkaline solution with hydrochloric acid and is taken up in ether. The ethereal solution is then washed, dried and evaporated. After recrystallization from ethyl acetate/petroleum ether the 5-(3'-ethoxy - propylidene) - dibenzo[a,d]cyclohepta[1,4,6]triene 10-carboxylic acid forms colorless crystals melting at 110–115°.

EXAMPLE 11

5 g. of 5-(3'-methoxy-propylidene)-dibenzo[a,d]cyclohepta[1,4,6]triene 10-carboxylic acid methyl ester and 20 ml. of a methanolic ammonia solution are heated at 100° for 3 hours in a sealed tube. After evaporating off the methanol there remains behind the 5-(3'-methoxypropylidene)-dibenzo[a,d]cyclohepta[1,4,6]triene 10-carboxylic acid amine which is recrystallized from benzene/petroleum ether and melts at 164–166°.

The 5-(3'-methoxy-propylidene)-dibenzo[a,d]cyclohepta[1,4,6-]triene 10-carboxylic acid methyl ester used as starting material can be manufactured as follows:

16 g. of 5-(3'-methoxy-propylidene)-dibenzo[a,d] cyclohepta[1,4,6]triene 10-carboxylic acid chloride is dissolved in 30 ml. of dry acetone, added dropwise with stirring to 200 ml. of methanol and the whole reaction mixture boiled for about 10 minutes. The alcohol is then evaporated, the residue taken up in ether, the ethereal solution washed with sodium carbonate, dried and evaporated. The 5-(3'-methoxy-propylidene)-dibenzo[a,d]cyclohepta[1,4,6]triene 10-carboxylic acid methyl ester is recrystallized from petroleum ether and melts at 87–88°.

EXAMPLE 12

By replacement of the ammonia in Example 11 with monomethylamine there is obtained 5-(3'-methoxy-propylidene)-dibenzo[a,d]cyclohepta[1,4,6]triene 10-carboxylic acid methyl amide of melting point 178–180° (recrystallized from benzene/petroleum ether).

EXAMPLE 13

By reaction of 5-(3'-methoxy-propylidene)-dibenzo-[a,d]cyclohepta[1,4,6]triene 10-carboxylic acid chloride with 4-chlorobenzyl-piperidine in benzene there is obtained 5-(3'-methoxy-propylidene)-10-[4'-(4''-chlorobenzyl) - piperazino - carbonyl] - dibenzo[a,d]cyclohepta[1,4,6]triene, which is recrystallized from methanol/water and melts at 163–164°.

EXAMPLE 14

25 g. of polyvinylpyrrolidone is dissolved in 120 g. of isopropanol in an appropriate vessel (e.g. wide neck flask). To this mixture there is added portionwise, while stirring, a mixture of 100 g. of 5-(3-methoxy-propylidene) - dibenzo[a,d]cyclohepta[1,4,6]triene carboxylic acid dimethyl amide, 500 g. of lactose and 300 g. of corn starch. The moist mass is granulated through a suitable sieve and dried at about 60° in an aerated drying oven.

To the dried granulate are added 25 g. of corn starch, 40 g. of talc and 10 g. of magnesium stearate, whereupon the mixture is thoroughly mixed and pressed into kernels, the weight of which depends upon the dosage of active substance (for example, 112 mg. for 10 mg. dragées; 280 mg. for 25 mg. dragées).

After drying, the kernels are covered (up to 60 percent of their weight) with a layer of concentrated sugar syrup containing 5 percent each of starch and talc, and dried several hours at about 35°.

Drageification is then continued with a concentrated sugar syrup until the weight of the layer equals that of the kernel. The dragées are finally polished with one or more appropriate waxes and dried several hours.

EXAMPLE 15

A solution of 12.6 g. of 10-chlorocarbonyl-dibenzo[a,d]cyclohepta[1,4,6]trien-5-one in 50 ml. of dry benzene is added dropwise with stirring to a solution of 10 g. of dimethylamine in 100 ml. of dry benzene. During the addition, the temperature of the reaction mixture is maintained at 20–25° via external cooling. After the addition, the reaction mixture is stirred 30 minutes and is then heated under reflux for still a further 30 minutes. The benzene and excess dimethylamine is then distilled off under reduced pressure. The residue is taken up in benzene and the resultant solution washed with water, dilute hydrochloric acid, water, sodium bicarbonate solution and then once again with water. The solution is then dried and concentrated yielding as the residue, dibenzo[a,d]cycloheptal[1,4,6]trien-5-one 10-carboxylic acid dimethylamide which, after recrystallization from high boiling petroleum ether, melts at 146–147°.

The 10-chlorocarbonyl-dibenzo[a,d]cycloheptal[1,4,6]trien-5-one used as the starting compound can be prepared as follows:

In a 500 ml. round bottom flask equipped with a stirrer, reflux condenser and gas inlet tube, 50 g. of 10-bromo-dibenzo[a,d]cyclohepta[1,4,6]trien-5-one is dissolved in 150 ml. of ethylene glycol. The solution is then saturated with hydrogen chloride gas. During the addition of the gas, the solution is strongly agitated and the temperature rises to 85°. After the addition, the reaction mixture is stirred for one hour at 100° (bath temperature), then cooled and poured into excess ice cold caustic soda. The reaction mixture is then filtered with suction and recrystallized from high boiling petroleum ether to yield 10-bromo-5,5-ethylenedioxy - dibenzo[a,d]cyclohepta[1,4,6]triene melting at 171–172°.

In a one liter 3-necked flask, equipped with a stirrer, a dropping funnel and a reflux condenser, a few drops of methyl iodide are added to 9 g. of magnesium shavings. As soon as the reaction has started, a solution of 78.6 g. of 10-bromo-5,5-ethylenedioxy-dibenzo[a,d]cyclohepta[1,4,6]triene in 450 ml. of dry, peroxide-free tetrahydrofuran is added dropwise in such a manner that the reaction mixture is maintained at a temperature between 40 and 42°. After the addition is completed, the reaction mixture is heated for a further 3 hours under reflux conditions and during this heating the magnesium nearly completely disappears. After the heating, a stream of dry carbon dioxide gas is introduced at —40° into the resultant yellow brown solution. After two hours, the reaction terminates. The reaction mixture is then decomposed via the addition of a saturated ammonium chloride solution. The tetrahydrofuran is then evaporated off under reduced pressure and the residue dissolved with methylene chloride and the resultant solution extracted with dilute sodium carbonate solution. The alkaline solution is then esterified with hydrochloric acid yielding, as a precipitate, 10-carboxy - 5,5 - ethylenedioxy - dibenzo[a,d]cyclohepta[1,4,6]triene which, after recrystallization from ethyl acetate/petroleum ether, melts as 276–278°.

50 g. of 10-carboxy-5,5-ethylenedioxy-dibenzo[a,d]cyclohepta[1,4,6]triene, 50 ml. of concentrated hydrochloric acid and 500 ml. of acetone are heated together for one hour under reflux conditions. The solvents are then evaporated off and the residue dissolved in aqueous sodium bicarbonate. The so-obtained solution is then filtered over charcoal and esterified with hydrochloric acid. The precipitated reaction product is then taken up in methylene chloride solution, dried and concentrated. The so-obtained residual 10-carboxy - dibenzo[a,d]cyclohepta[1,4,6]trien-5-one, after recrystallization from ethyl acetate/petroleum ether, melts at 202–204°.

12.5 g. of 10 - carboxy-dibenzo[a,d]cyclohepta[1,4,6]trien-5-one and 40 ml. of thionyl chloride are heated together for one hour under reflux conditions. The excess thionyl chloride is then distilled off under reduced pressure, yielding as the residue, crude solid 10-chlorocarbonyl-dibenzo[a,d]cyclohepta[1,4,6]trien-5-one.

EXAMPLE 16

10 g. of 10 - chlorocarbonyl - dibenzo[a,d]cyclohepta[1,4,6]trien-5-one is dissolved in 30 ml. of dry benzene and then added at 20–25° to a mixture of 16 g. of N-methyl-N-$\beta$-picolylamine and 100 ml. of dry benzene. The reaction mixture is then stirred for one hour at 20°, diluted with ether and shaken thoroughly with dilute hydrochloric acid. The acid solution is then treated with an excess of potassium carbonate and the oil which separates, extracted with ether. The ether solution was then dried and evaporated, yielding as the residue 10-(N-methyl-N-$\beta$ - picolyl - carbamoyl) - dibenzo[a,d]cyclohepta[1,4,6]trien-5-one, melting at 158–159°.

EXAMPLE 17

By replacement of the N-methyl-N-$\beta$-picolyl-amine in the process of Example 16 with 12 g. of 4-hydroxyethyl-piperazine there is obtained 10-[(4-hydroxyethyl-piperazinyl) - carbonyl] - dibenzo[a,d]cyclohepta[1,4,6]trien-5-one, the hydrochloride of which, upon recrystallization from ethanol/ether, melts at 274–276°.

EXAMPLE 18

By the replacement of the N-methyl-N-$\beta$-picolyl-amine in the process of Example 16 with 20 g. of N-isopropyl-N-benzylamine there is obtained, as colorless crystals melting at 149–150°, 10-(N-isopropyl-N-benzyl-carbamoyl)-dibenzo[a,d]cyclohepta[1,4,6]trien-5-one.

EXAMPLE 19

A solution of 12 g. of 10-chlorocarbonyl-dibenzo[a,d]cyclohepta[1,4,6]trien-5-one in 30 ml. of dry acetone is added dropwise at 10–15° to 200 ml. of concentrated aqueous ammonia solution.

The resultant precipitate is 10-carbamoyl-dibenzo[a,d]cyclohepta[1,4,6]trien-5-one which melts, after recrystallization from ethanol/water, at 209–211°.

EXAMPLE 20

A solution of 10 g. of 10-chlorocarbonyl-dibenzo[a,d]cyclohepta[1,4,6]trien-5-one in 30 ml. of dry benzene is added to a mixture of 20 ml. of methylamine and 100 ml. of dry benzene. The reaction mixture is then stirred for one hour at 20° and thereafter washed with water, dilute hydrochloric acid, sodium carbonate solution and lastly with water, dried and concentrated yielding as the residue, 10-methyl-carbamoyldibenzo[a,d]cyclohepta[1,4,6]trien - 5 - one which melts, after recrystallization from methanol/water, at 199–200°.

EXAMPLE 21

By the replacement of the methylamine in the process of Example 20 with 10 g. of diethylamine there is obtained 10 - diethylcarbamoyl - dibenzo[a,d]cyclohepta[1,4,6-]

trien-5-one, which after recrystallization from high boiling petroleum ether, melts at 110–112°.

EXAMPLE 22

9 g. of 10-carboxy-5,5-ethylenedioxy-dibenzo[a,d]cyclohepta[1,4,6]triene and 100 ml. of thionyl chloride are heated under reflux conditions for one hour. The excess thionyl chloride is then distilled off under reduced pressure and the residual 10-chlorocarbonyl-5,5-ethylenedioxy-dibenzo[a,d]cyclohepta[1,4,6]triene dissolved in 50 ml. of dry benzene. The resultant solution is then added dropwise to a solution of 50 g. of dimethylamine in 300 ml. of dry benzene. During this addition, the temperature of the reaction mixture is maintained at 20–25° by external cooling. After the addition, the reaction mixture is stirred for 30 minutes at 20° and then heated under reflux conditions for a further 30 minutes. The benzene and the excess dimethylamine are then distilled off under reduced pressure and the residue taken up in benzene. The resultant solution is then washed with water, dilute hydrochloric acid, water, sodium bicarbonate solution and water. It is then dried and concentrated, yielding as the residue, 10-dimethylcarbamoyl - 5,5 - ethylenedioxy - dibenzo[a,d]cyclohepta [1,4,6]triene which, after recrystallization from high boiling petroleum ether, melts at 204–205°.

EXAMPLE 23

A solution of 10 g. of 10-chlorocarbonyl-5-methylene-dibenzo[a,d]cyclohepta[1,4,6]triene in 30 ml. of dry benzene, is added dropwise to a solution of 20 ml. of dimethylamine in 100 ml. of benzene. The reaction mixture is then worked up according to the procedure described in Example 15 above, and the so-obtained crude 10-dimethylcarbamoyl - 5 - methylenedibenzo[a,d]cyclohepta [1,4,6]triene, after recrystallization from ethylacetate petroleum ether, melts at 132–134°.

The 10-chlorocarbonyl-5-methylamine-dibenzo[a,d] cyclohepta[1,4,6]triene employed as the starting material above can be prepared as follows:

In a one liter round bottom flask equipped with a stirrer, dropping funnel and reflux condenser, 5.4 g. of magnesium shavings are covered over with 20 ml. of dry ether and then, 2 ml. of a solution of 30 g. of methyl iodide in 100 ml. of ether is added thereto. As soon as the reaction has started, the remainder of the methyl iodide solution is added dropwise in a manner so that the reaction mixture is maintained at a boiling state. After the addition is completed, the reaction mixture is stirred for one hour at 20° and then cooled to −40°. A solution of 57 g. of 10 - bromo - dibenzo[a,d]cyclohepta[1,4,6] trien-5-one in 300 ml. of ether is then added, after which the whole reaction mixture is stirred for 20 hours at 20°.

The reaction mixture is then cooled with ice water and treated with a cold saturated ammonium chloride solution. The organic layer is separated and the aqueous phase extracted with 200 ml. of ether. The combined ether portions are then dried over sodium sulphate and concentrated, yielding at a thick oily residue, 5-hydroxy-5-methyl-10-bromo-dibenzo[a,d]cyclohepta[1,4,6]triene.

30 g. of 5-hydroxy-5-methyl-10-bromo-dibenzo[a,d]cyclohepta[1,4,6]triene and 300 ml. of 3 percent ethanolic hydrochloric acid are heated on a steam bath under reflux conditions for 3 hours. Thereafter, the solution is concentrated under reduced pressure, the residue taken up in ether and the ether solution washed with aqueous sodium bicarbonate solution and then with water, after which it is dried over sodium sulphate and concentrated. The residue is then distilled at 0.03 mm. Hg and 160° and recrystallized from low boiling petroleum ether, yielding as colorless crystals, 5-methylene-10-bromo-dibenzo[a,d] cyclohepta[1,4,6]triene melting at 80–82°.

In a one liter round bottom flask equipped with a stirrer, dropping funnel and reflux condenser, a few drops of methyl iodide are added to 4.5 g. of magnesium shavings. As soon as the reaction has started, a solution of 40 g. of 5-methylene-10-bromo-dibenzo[a,d]cyclohepta-[1,4,6]triene in 200 ml. of dry, peroxide-free tetrahydrofuran is added dropwise in such a manner that the temperature of the reaction mixture is maintained between 50 and 55°. After the addition is completed, the reaction mixture is heated under reflux conditions for three hours. The resultant yellow brown solution is then cooled to −40° and anhydrous carbon dioxide gas introduced. After two hours, the reaction terminates. The reaction mixture is then decomposed with a saturated ammonium chloride solution. The tetrahydrofuran is evaporated off under reduced pressure and the residue is extracted with ether. The ether solution is then shaken up with dilute sodium carbonate solution and the so-obtained alkaline solution acidified with hydrochloric acid whereupon the reaction product precipitates. The precipitate product is taken up in ether, the ether solution washed, dried and evaporated, yielding as the residue 5-methylene - 10 - carboxy-dibenzo[a,d]cyclohepta[1,4,6]triene, which after recrystallization from ethyl acetate/petroleum ether, melts at 210–212°.

The so-obtained 5-methylene - 10 - carboxy-dibenzo-[1,4,6]trien-5-one which, after recrystallization from benzene/petroleum ether, melts at 155–156°.
6]trien-5-one according to the chlorination procedure described in Example 15 above.

EXAMPLE 24

A solution of 10 g. of 10-chlorocarbonyl-dibenzo[a,d] cyclohepta[1,4,6]trien-5-one in 30 ml. of dry benzene is added dropwise to a solution of 10 g. of morpholine in 100 ml. of benzene. The reaction mixture is then worked up according to the procedure given in Example 15 above, yielding 10-morpholinocarbonyl-dibenzo[a,d]cyclohepta-[1,4,6]trien-5-one which, after recrystallization from benzene/petroleum ether, melts at 155–156°.

EXAMPLE 25

7 g. of 10-carbomethoxy-dibenzo[a,d]cyclohepta[1,4,6]trien-5-one and 30 ml. of 30 percent methanolic dimethylamine solution are heated for three hours at 100° in a sealed tube. The residue obtained after the evaporation of the methanol is 10-dimethylcarbamoyl-dibenzo [a,d]cyclohepta[1,4,6]trien-5-one which, after recrystallization from high boiling petroleum ether, melts at 146–147°.

The 10 - carbomethoxy-dibenzo[a,d]cyclohepta[1,4,6] trien-5-one used as the starting material above can be prepared as follows:

10 g. of 10-chlorocarbonyl-dibenzo[a,d]cyclohepta[1,4,6]trien-5-one is dissolved in 40 ml. of dry acetone and the solution is then added dropwise with stirring to 200 ml. of methanol. The whole reaction mixture is then briefly heated to boiling, after which the methanol is evaporated off and the residue taken up in ether. The ether solution is then washed, dried and evaporated, yielding 10-carbomethoxy - dibenzo[a,d]cyclohepta[1,4,6]trien-5-one which, after recrystallization from high boiling petroleum ether melts at 112–114°.

EXAMPLE 26

In a 500 ml. round bottom flask equipped with stirrer, dropping funnel and reflux condenser, 1.25 g. of magnesium shavings are covered over with 10 ml. of dry ether and with 1 ml. of a solution of 7.16 g. of methyl iodide in 25 ml. of ether. As soon as the reaction has started, the remainder of the methyl iodide solution is added dropwise in such a manner that the reaction mixture is maintained at a boiling state. The reaction mixture is then stirred for one hour at 20° and then, after the addition of a solution of 13.8 g. of 10-dimethylcarbamoyl - dibenzo[a,d]cyclohepta[1,4,6]triene-5-one and 75 ml. of dry ether, stirred for a further three hours at 20°.

The reaction mixture is then cooled with ice water and treated with a cold saturated ammonium chloride solution. The aqueous phase is separated from the organic layer and extracted with 100 ml. of ether. The combined ether portions are then dried over sodium sulphate and evaporated, yielding as the residue 10-dimethylcarbamoyl-5 - hydroxy - 5 - methyl-dibenzo[a,d]cyclohepta[1,4,6]triene which, after recrystallization from ethyl acetate/petroleum ether, melts at 200–202°.

5 g. of 10-dimethylcarbamoyl-5-hydroxy-5-methyl-dibenzo[a,d]cyclohepta[1,4,6]triene and 50 ml. of one percent ethanolic hydrochloric acid solution are heated under reflux conditions for one hour on a steam bath. After the solution is concentrated under reduced pressure, the residue is taken up in methylene chloride and the methylene chloride solution washed with aqueous sodium carbonate and with water, dried over sodium sulphate and evaporated. There is thus obtained 10-dimethylcarbamoyl-5 - methylene-dibenzo[a,d]cyclohepta[1,4,6]triene which, after recrystallization from ethyl acetate/petroleum ether, melts at 132–134°.

EXAMPLE 27

25 g. of polyvinylpyrrolidone (K30) (average molecular weight of about 40,000) is dissolved in 120 g. of isopropanol. To this solution there is then added with stirring, a mixture of 100 g. of 10-dimethylcarbamoyl-dibenzo[a,d]cyclohepta[1,4,6]trien-5-one, 500 g. of lactose and 300 g. of corn starch. The moist mass is then passed through a suitable sieve and dried in a ventilated dryer at about 60°. The dried granulation is then mixed with 25 g. of corn starch, 40 g. of talc and 10 g. of magnesium stearate. From the so-obtained thoroughly intermixed granulation, there are pressed dragées weighing 112 mg. each with an active ingredient content of 10 mg., or weighing 280 mg. each with an active ingredient content of 25 mg. Subsequently, the pressed tablets can be coated with a concentrated sugar syrup according to conventional pharmaceutical methodolgy.

EXAMPLE 28

3.5 g. 10(11) - carboxy - 3 - chloro-dibenzo[a,d]cyclohepta[1,4,6]trien-5-one and 30 ml. of thionyl chloride were reacted together for 1 hour at reflux. The excess thionyl chloride was thereafter removed by distillation at reduced pressure. The resulting 10-chloro-carbonyl-3-chloro - dibenzo[a,d]cyclohepta[1,4,6]trien - 5 - one is dissolved in 20 ml. of dry benzene and added dropwise to a solution containing 20 g. of dimethylamine in 100 ml. of benzene. The reaction temperature is maintained at 20–25° through outside cooling. The reaction mixture is thereafter heated for another hour at 20° and then the benzene and the excess amine are removed by distillation at reduced pressure. The residue is taken up in benzene. The resulting solution is washed with water, dilute HCl, water, sodium carbonate solution, again with water, dried and evaporated. The resulting 10(11)-dimethylcarbamoyl-3 - chloro-dibenzo[a,d]cyclohepta[1,4,6]trien - 5 - one after recrystallization from benzene/petroleum ether has a melting point of 126–128°.

The 10(11)-carboxyl-3-chloro-dibenzo[a,d]cyclohepta[1,4,6]trien-5-one utilized as a starting material can be prepared, for example, as follows:

64 g. of 3-chloro-dibenzo[a,d]cyclohepta[1,4,6]trien-5-one is dissolved in 550 ml. of chloroform and thereafter treated with 13.88 ml. of bromine. The brown color disappears instantaneously. After reaction is completed, the solution is evaporated under reduced pressure and the residue is dissolved in benzene to yield 3-chloro-10,11-dibromo-dibenzo[a,d]cyclohepta[1,4]dien-5-one having a melting point of 172–174°.

76.6 g. of 3-chloro-10,11-dibromo-dibenzo[a,d]cyclohepta[1,4]dien-5-one dissolved in 800 ml. of ethanol and 11.48 g. of potassium hydroxide dissolved in 20 ml. of water are reacted together for 3 hours under reflux. The ethanol is removed by distillation under reduced pressure, and the residue is taken up in chloroform. The chloroform solution is washed neutral with water, dried over sodium sulfate and evaporated. Through fractional crystallization from benzene and then from ethanol, two isomers of 3-chloro - 10(11)bromo-dibenzo[a,d]cyclohepta[1,4,6]trien-5-one are obtained, the α-isomer has a melting point of 178–179° and the β-isomer has a melting point of 129–132°.

A mixture containing 63 g. of 3-chloro-10(11)bromo-dibenzo[a,d]cyclohepta[1,4,6]trien-5-one, 250 ml. of ethylene glycol and 0.75 g. of p-toluenesulfonic acid are warmed together with vigorous stirring on a water bath at 200°. Then at a pressure of 30 mm./Hg 200 ml. of ethylene glycol are distilled over a 2½-hour period.

The cooled residue is treated with 50 ml. of a 12 percent solution of caustic soda and 30 ml. of water. The product is filtered, washed with water and recrystallized from ethanol to yield 10(11)bromo-3-chloro-5,5-ethylenedioxy-dibenzo[a,d]cyclohepta[1,4,6]triene having a melting point of 182°. In a 250 ml. 3-necked flask equipped with a stirrer, dropping device and reflux condenser, 2.25 g. of magnesium chips are treated with 2 drops of methyl iodide and as soon as the reaction starts, a solution containing 21.1 g. of 10(11)bromo-3-chloro-5,5-ethylenedioxydibenzo[a,d]cyclohepta[1,4,6]triene in 125 ml. of peroxide free tetrahydrofuran is added dropwise and the temperature is maintained at 60°. Thereafter, the reaction mixture is reacted for 3 hours under reflux conditions whereby the magnesium chips disappear. Then, the brown solution is treated with a stream of dry carbonic acid at −40°. After 2 hours, the reaction mixture through the addition of dilute hydrochloric acid is decomposed and the tetrahydrofuran is evaporated under reduced pressure. The residue is extracted with ethyl acetate and the solution is taken up with sodium carbonate solution. After acidification of the alkaline solution with hydrochloric acid, the 10(11)carboxy-3-chloro-5,5-ethylenedioxy - dibenzo[a,d]cyclohepta[1,4,6]triene precipitates and after recrystallization from ethanol/water has a melting point of 300°.

4.4 g. of 10(11)carboxy-3-chloro-5,5-ethylenedioxy-dibenzo[a,d]cyclohepta[1,4,6]triene, 200 ml. of acetone and 30 ml. of concentrated hydrochloric acid are heated together for 1 hour under reflux conditions. After removal of the solvent, the residue is dissolved in an aqueous sodium carbonate solution. This solution is filtered and acidified with hydrochloric acid. The precipitated product, 10(11)carboxy-3-chloro - dibenzo[a,d]cyclohepta[1,4,6]trien-5-one, after recrystallization from methanol has a melting point of 207–209°.

EXAMPLE 29

8 g. of 5-hydroxy-5-(3'-methoxy-propyl)-dibenzo[a,d]cyclohepta[1,4,6]trien-10-carboxylic acid dimethylamide, 80 ml. of absolute alcohol and 8 ml. of a 20 percent solution of hydrochloric acid in ethanol were warmed on a water bath under reflux conditions for 3 hours. The solution was evaporated to dryness under reduced pressure. The residual 5-(3'-methoxy-propylidene)-dibenzo[a,d]cyclohepta[1,4,6]trien-10-carboxylic acid dimethylamide after recrystallization from aqueous methanol has a melting point of 102–103°.

The 5-hydroxy - 5 - (3'-methoxy-propyl)-dibenzo[a,d]cyclohepta[1,4,6]trien-10-carboxylic acid dimethylamide utilized as a starting material can be prepared as follows:

57 g. of 10-bromo-dibenzo[a,d]cyclohexpta[1,4,6]trien-5-one, 36 g. copper cyanide and 200 ml. dimethylformamide are heated together under reflux conditions for 5 hours. After the solvent is removed by distillation under reduced pressure, the residue is taken up in methylene chloride. The methylene chloride solution is washed with water, dried and evaporated. The residual 10-cyano-dibenzo[a,d]cyclohepta[1,4,6]trien-5-one after recrystallization from ethanol has a melting point of 174–175°.

9.24 g. of 10-cyano-dibromo[a,d]cyclohepta[1,4,6]trien-5-one in 10 ml. of ethanol and 3.2 ml. of 3- N caustic soda are treated dropwise with 16 ml. of 30 percent of hydrogen peroxide. The temperature is maintained below 50° cooling. The reaction mixture is heated at 50° for 3 hours and thereafter evaporated. The residue is extracted with methylene chloride and the extract is shaken with sodium carbonate. Thereafter, the alkaline solution is acidified with hydrochloric acid and 10-carboxy-dibenzo [a,d]cyclohepta[1,4,6]trien-5-one precipitates. After recrystallization from ethyl acetate/petroleum ether, the product has a melting point of 201–203°.

12.5 g. of 10-carboxy-dibenzo[a,d]cyclohepta[1,4,6] trien-5-one and 40 ml. of thionyl chloride are reacted together for 1 hour under reflux conditions. Thereafter, the excess thionly chloride is removed under vacuum distillation whereby 10-chlorocarbonyl-dibenzo[a,d]cyclohepta[1,4,6]trien-5-one remains behind.

To a solution containing 10 g. of dimethylamine in 100 ml. of dry benzene is added dropwise a solution containing 12.6 g. of 10-chloro-carbonyl-dibenzo[a,d]cyclohepta[1,4,6]trien-5-one in 50 ml. of dry benzene with stirring. The reaction temperature is maintained at 20–25° through external cooling. Thereafter, the reaction mixture is heated for 30 minutes under reflux conditions. Then, the benzene and the excess amine are removed by distillation under reduced pressure. The residue is taken up in benzene and the solution is washed with water, dilute hydrochloric acid, water, sodium bicarbonate solution and again with water, dried and evaporated. The resulting dibenzo [a,d]cyclohepta[1,4,6]trien-5-one-10-carboxylic acid dimethylamide after recrystallization from petroleum ether has a melting point 146–147°.

In a 500 ml. 3-necked flasked equipped with stirrer, dropping device and ammonia condenser, 100 ml. of liquid ammonia are dried through the introduction of sodium chips until the appearance of stable blue color. Thereafter, 1.4 g. of sodium are introduced in small portions and the mixture is stirred over a 15-minute period. The resulting blue solution is treated dropwise with 4.5 g of methyl propargyl ether, heated for 2 hours whereby the blue color disappears. The solution is stirred after the portionwise addition of 16.6 g. of dibenzo[a,d]cyclohepta-[1,4,6]triene - 5 - one - 10 - carboxylic acid dimethylamide and heated for a period of 5 hours. Then it is treated with 6 g. of ammonium chloride and taken up with 100 ml. of ether. The ammonia is removed by distillation overnight. The following day the reaction mixture is shaken out with water. The ether is removed and dried. After the evaporation of the ether, the remaining 5-hydroxy - 5 - (3' - methoxy - propinyl) - dibenzo[a,d] cyclohepta[1,4,6]triene - 10 - carboxylic acid dimethylamide is further purified by the following procedure:

13.1 g. of 5 - hydroxy - 5 - (3' - methoxy-propinyl)-dibenzo[a,d]cyclohepta[1,4,6]triene - 10 - carboxylic acid dimethylamide is hydrogenated in 250 ml. of isopropanol in the presence of platinum oxide under normal pressure and at room temperature. Following the hydrogenation, the solution is filtered to remove the catalyst. After removal of the isopropanol by distillation and recrystallization from ethyl acetate/petroleum ether, the 5-hydroxy-5 - (3' - methoxy - propyl) - dibenzo[a,d]cyclohepta-[1,4,6]triene - 10 - carboxylic acid dimethylamide has a melting point of 183–185°.

In an analogous manner through dehydrogenation, the following can be prepared:

From 5 - hydroxy - 5 - (3' - methoxy - propyl)-dibenzo-[a,d]cyclohepta[1,4,6]trien - 10 - carboxylic acid N-methyl - N - (β - picolyl)amide, The 5 - (3' - methoxy - propylidene) - dibenzo[a,d] cyclohepta[1,4,6]trien - 10 - N - methyl - N - (β-picolyl)-amide, melting point 103–105°;

From 5 - hydroxy - 5 - (3' - methoxy - propyl)-10-[4'-(2" - hydroxyethyl) - piperazino - carbonyl] - dibenzo-[a,d]cyclohepta[1,4,6]triene, The 5 - (3' - methoxy - propylidene) - 10 - [4' - (2"-hydroxy - ethyl) - piperazino - carbonyl] - dibenzo[a,d] cyclohepta[1,4,6]triene, melting point 210–213°;

From 5 - hydroxy - 5 - (3' - methoxy - propyl)-dibenzo-[a,d]cyclohepta[1,4,6]triene - 10 - carboxylic acid-(2'-dimethylamino - ethylamide), The 5 - (3' - methoxy-propylidene) - dibenzo[a,d]cyclohepta[1,4,6]tirene - 10 - carboxylic acid - (2' - dimethylamino - ethylamide), melting point 118–119°;

From 5 - hydroxy - 5 - (3' - methoxy - propyl) - dibenzo[a,d]cyclohepta[1,4,6]trien - 10 - carboxylic acid-N,N - dimethylamidine - hydrochloride, The 5 - (3' - methoxy - propylidene) - dibenzo[a,d] cyclohepta[1,4,6]triene - 10 - carboxylic acid - N,N - dimethylamidine hydrochloride, melting point 290–291°;

From 5 - hydroxy - 5 - (3' - methoxy - propyl)-dibenzo-[a,d]cyclohepta[1,4,6]triene - 10 - carboxylic acid - N-methyl-N-benzylamide, The 5 - (3' - methoxy - propylidene) - dibenzo[a,d] cyclohepta[1,4,6]triene - 10 - carboxylic acid - N-methyl-N-benzylamide, melting point 124–126°;

From 5 - hydroxy - 5 - (3' - methoxy - propyl)-dibenzo-[a,d]cyclohepta[1,4,6]triene - 10 - carboxylic acid-diethylamide, The 5 - (3' - methoxy - propylidene) - dibenzo[a,d] cyclohepta[1,4,6]trien - 10 - carboxylic acid - diethylamide, melting point 118–120°;

From 5 - hydroxy - 5 - (3' - chloro - propyl) - dibenzo-[a,d]cyclohepta[1,4,6]triene - 10 - carboxylic acid-dimethylamide, The 5 - (3' - chloro - propylidene) - dibenzo[a,d]cyclohepta[1,4,6]triene - 10 - carboxylic acid - dimethylamide, melting point 141–143°;

From 5 - hydroxy - 5 - (3' - ethoxy - propyl)-dibenzo-[a,d]cyclohepta[1,4,6]triene - 10 - carboxylic acid-dimethylamide, The 5 - (3' - ethoxy - propylidene) - dibenzo[a,d]cyclohepta[1,4,6]trien - 10 - carboxylic acid - dimethylamide, melting point 123–124°;

From 5 - hydroxy - 5 - (3' - methoxy - propyl)-dibenzo-[a,d]cyclohepta[1,4,6]triene - 10 - carboxylic acid amide, The 5 - (3' - methoxy - propylidene) - dibenzo[a,d] cyclohepta[1,4,6]triene - 10 - carboxylic acid - amide, melting point 164–166°; and From 5 - hydroxy - 5 - (3' - methoxy - propyl)-dibenzo-[a,d]cyclohepta[1,4,6]triene-10 - carboxylic acid-methylamide, The 5 - (3' - methoxy - propylidene) - dibenzo[a,d] cyclohepta[1,4,6]triene - 10 - carboxy - methylamide, melting point 178–180°.

EXAMPLE 30

10 g. of 10 - carboxy - dibenzo[a,d]cyclohepta[1,4,6] triene-5-one and 50 ml. of thionyl chloride are boiled together 1 hour under reflux conditions. The residual thionyl chloride is distilled off under reduced pressure. The 10 - chlorocarbonyl - dibenzo[a,d]cyclohepta[1,4,6]trien-5-one obtained is dissolved in 40 ml. of dried benzene and added dropwise to a solution of 10 g. of pyrrolidine in 100 ml. of dry benzene. The reaction temperature is kept at 20 to 25° C. by external cooling. The reaction mixture is afterwards stirred 30 minutes at 20° C., washed with water, dilute hydrochloric acid, water, sodium carbonate solution and again with water, dried and evaporated to dryness. The remaining 10 - pyrrolidinocarbonyl - dibenzo-[a,d]cyclohepta[1,4,6]triene-5-one melts, after recrystallization from acetic ester/petroleum ether, at 142–143° C.

EXAMPLE 31

The crude 10-chlorocarbonyl-dibenzo[a,d]cyclohepta [1,4,6]triene-5-one obtained from 10 g. of 10-carboxy-dibenzo[a,d]cyclohepta[1,4,6]triene-5-one is dissolved in 50 ml. of dry benzene and added drop by drop to a solution of 10 g. of 2-methyl-piperidine in 100 ml. of dry benzene. The reaction temperature is kept at about 20° C. by external cooling. The reaction mixture is thereafter stirred for a further 30 minutes at 20° C., washed with water, dilute hydrochloric acid, water, sodium carbonate solution and again with water, dried over sodium sulphate and evaporated to dryness. The residual 10-(2-methyl-piperidino) - carbonyl - dibenzo[a,d]cyclohepta[1,4,6]triene-5-one melts, after recrystallization from acetic ester/petroleum ether, at 125–127° C.

What is claimed is:
1. A compound selected from the group consisting of compounds of the formula:

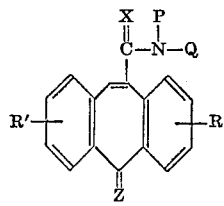

wherein X is oxygen; R and R' are each independently selected from the group consisting of hydrogen and halogen; Z is oxo; and P and Q are each independently selected from the group consisting of hydrogen, lower alkyl or 1–4 carbon atoms, benzyl, β-picolyl, and dilower alkylamino-lower alkyl, the alkyl groups of which each are of 1–4 carbon atoms; and P and Q taken together with the N atom are selected from the group consisting of piperidino, lower alkylpiperidino having 1–4 carbon atoms in the lower alkyl moiety, piperazino, pyrrolidino, morpholino, N⁴-hydroxy-lower alkyl-piperazino having 1–4 carbon atoms in the lower alkyl moiety and 4'-(4"-chlorobenzyl)piperazino, and pharmaceutically acceptable acid addition salts thereof.

2. A compound in accordance with claim 1, wherein R and R' are hydrogen.
3. A compound in accordance with claim 1, i.e., 10-morpholinocarbonyl - dibenzo[a,d]cyclohepta[1,4,6]trien-5-one.
4. A compound in accordance with claim 1, wherein R' is hydrogen and R is halogen.
5. A compound in accordance with claim 1, 10-dimethylcarbamoyl - dibenzo[a,d]cyclohepta[1,4,6]trien-5-one.
6. A compound in accordance with claim 1, 10-(N-methyl-N - β - picolyl-carbamoyl)-dibenzo[a,d]cyclohepta[1,4,6]trien-5-one.
7. A compound in accordance with claim 1, 10-[(4-hydroxyethyl - piperazinyl) - carbonyl]-dibenzo[a,d]cyclohepta[1,4,6]trien-5-one.
8. A compound in accordance with claim 1, 10-pyrrolidinocarbonyl - dibenzo[a,d]cyclohepta[1,4,6]trien-5-one.
9. A compound in accordance with claim 1, 10-(2-methylpiperidino) - carbonyl - dibenzo[a,d]cyclohepta[1,4,6]trien-5-one.

No references cited.

ALEX MAZEL, Primary Examiner
J. TOVAR, Assistant Examiner

U.S. Cl. X.R.

260—247.1, 247.2 R, 268 TR, 293.62, 295 T, 295.5 T, 326.3, 326.5 S, 326.5 C, 340.9, 514 R, 520, 558 R, 559 R; 424—248

UNITED STATES PATENT OFFICE
CERTIFICATE OF CORRECTION

Patent No. 3,726,870    Dated April 10, 1973

Inventor(s) GERALD REY-BELLET and HANS SPIEGELBERG

It is certified that error appears in the above-identified patent and that said Letters Patent are hereby corrected as shown below:

Column 23, claim 1, line 22, "or" should be of

Signed and sealed this 6th day of August 1974.

(SEAL)
Attest:

McCOY M. GIBSON, JR.
Attesting Officer

C. MARSHALL DANN
Commissioner of Patents